G. T. BOUNDS.
AGRICULTURAL IMPLEMENT.
APPLICATION FILED AUG. 29, 1911.
1,026,731.
Patented May 21, 1912.
3 SHEETS—SHEET 2.
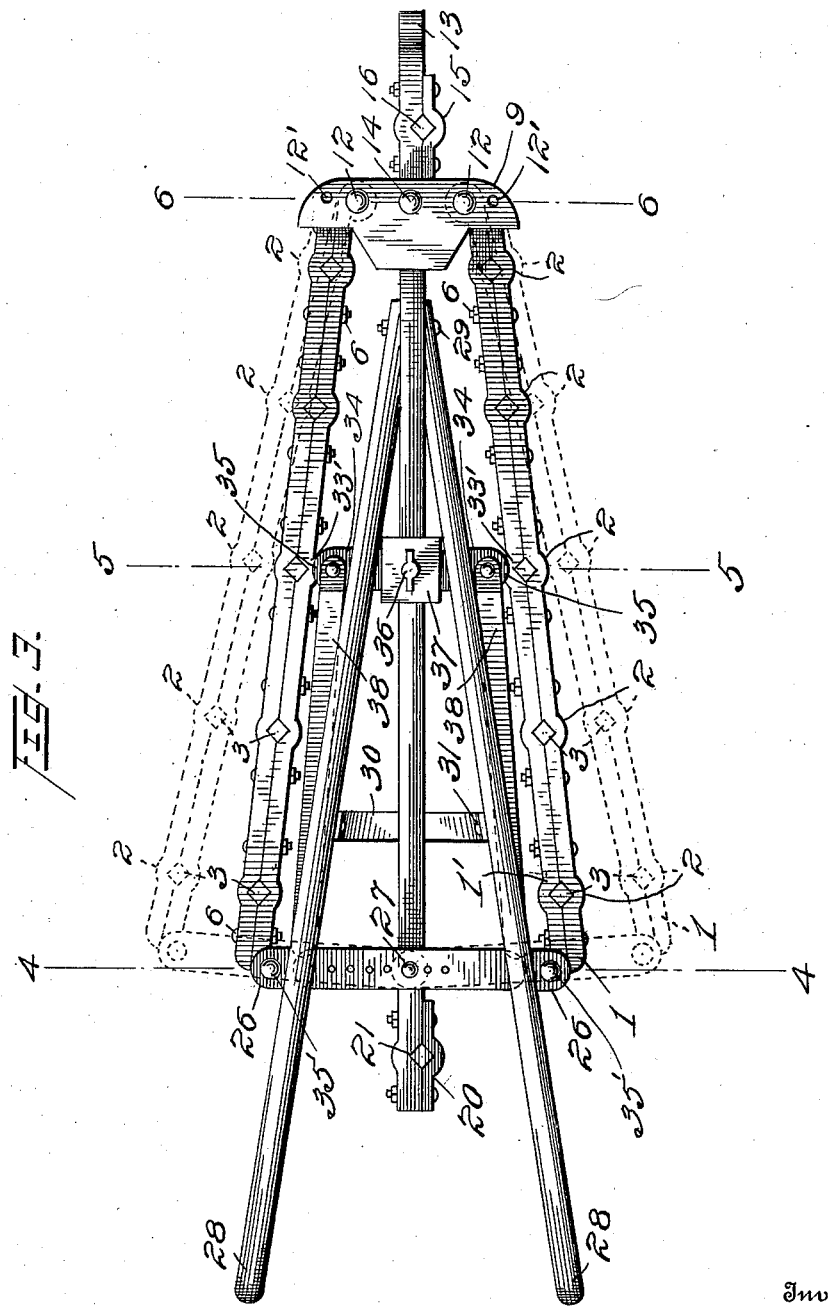
Witnesses
E. C. Duffy
N. E. Garner
Inventor
George T. Bounds
By John S. Duffie
Attorney G. T. BOUNDS.
AGRICULTURAL IMPLEMENT.
APPLICATION FILED AUG. 29, 1911.
1,026,731.
Patented May 21, 1912.
3 SHEETS—SHEET 3.
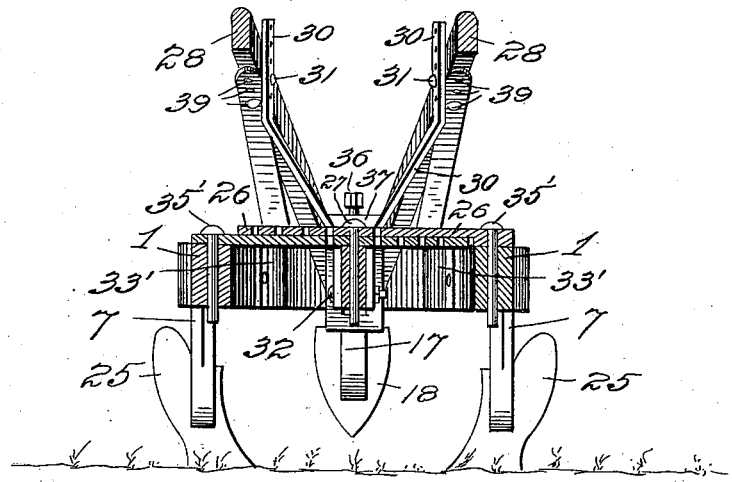
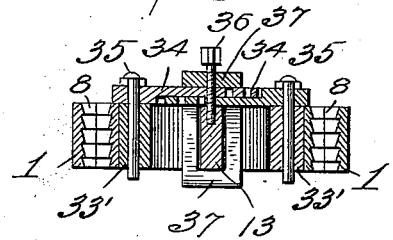
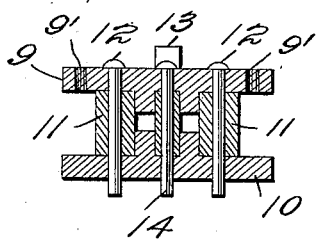
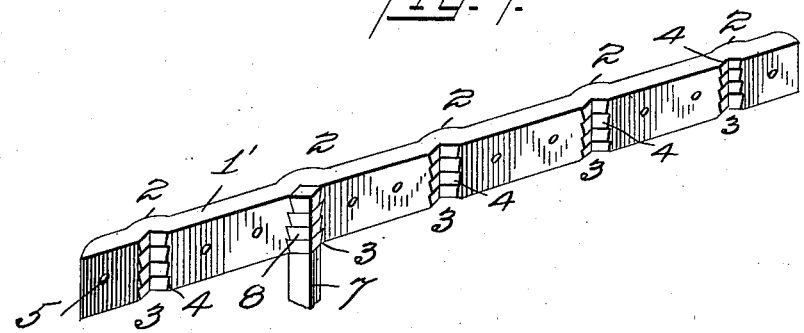
Witnesses
E. C. Duffy
N. E. Garver
Inventor
George T. Bounds
By John S. Duffie
Attorney

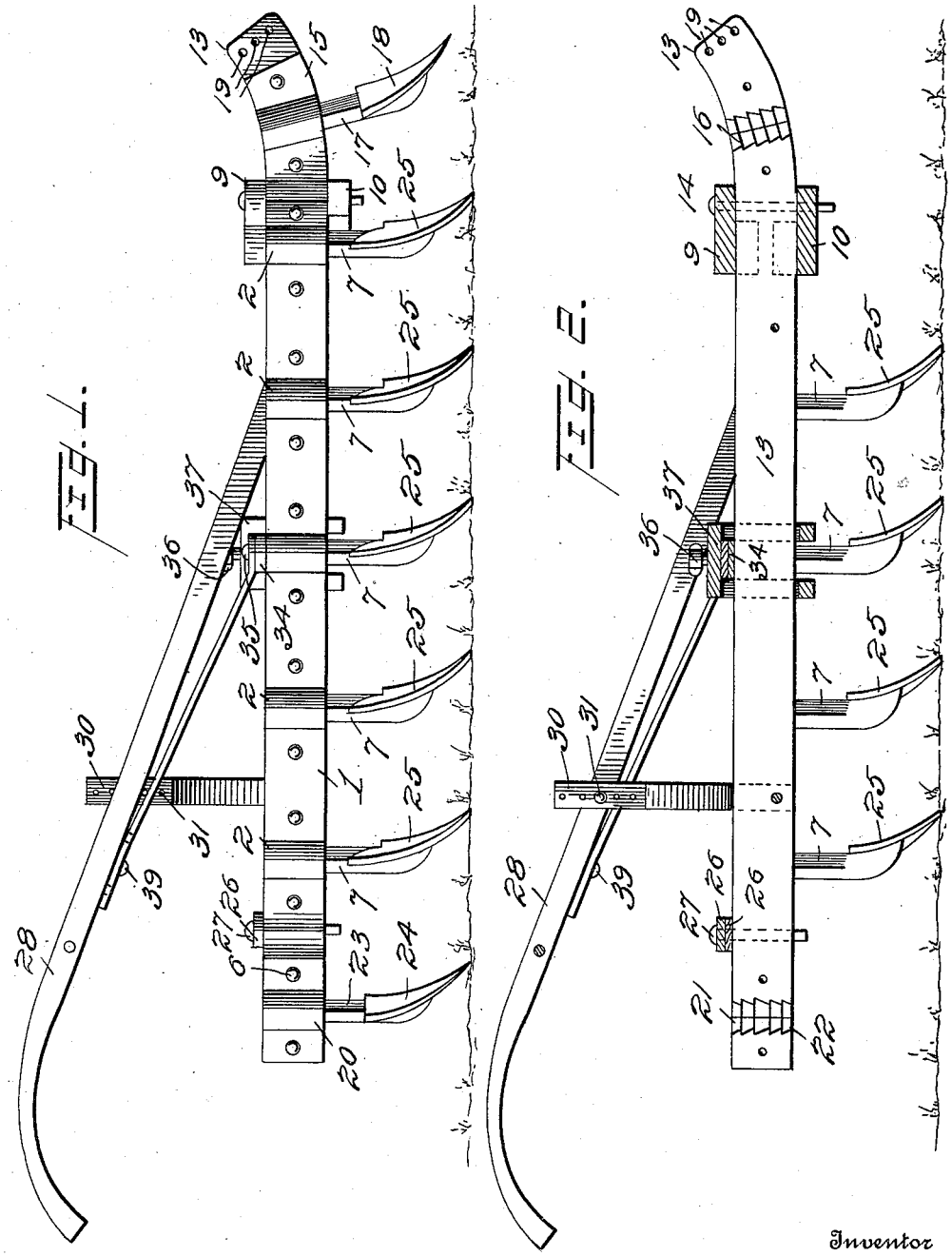

UNITED STATES PATENT OFFICE.

GEORGE T. BOUNDS, OF HAMPTON, ARKANSAS.

AGRICULTURAL IMPLEMENT.

1,026,731.  Specification of Letters Patent.  Patented May 21, 1912.

Application filed August 29, 1911. Serial No. 646,642.

*To all whom it may concern:*

Be it known that I, GEORGE T. BOUNDS, a citizen of the United States, residing at Hampton, in the county of Calhoun and State of Arkansas, have invented certain new and useful Improvements in Agricultural Implements, of which the following is a specification.

My invention is an agricultural implement designed to be used for various purposes, such as a harrow, breaking the soil, and as a cultivator, etc.

This device is constructed so that it may be easily put together and taken apart, so that the feet or plow points may be made longer or shorter in relation to the side beams and so that they may be set at different angles, and the side beams are so constructed and hinged that they may be connected near each other at their front end and wider from each other at their rear ends and the handles and braces thereof are so constructed that in widening and narrowing the ends of the beams the distance between said handles is not diminished or increased; the handles and their braces are so constructed that the handles may be set higher or lower to accommodate them to the operator of the device whether he be a tall or a short man.

In the accompanying drawings: Figure 1 is a side elevation of my invention. Fig. 2 is a longitudinal, sectional view of the inner half of the left-hand view of the same. Fig. 3 is a top plan view. Fig. 4 is a cross sectional view on the line 4—4 of Fig. 3. Fig. 5 is a detail cross sectional view on the line 5—5 of Fig. 3. Fig. 6 is a cross sectional view on the line 6—6 of Fig. 3. Fig. 7 is an inner face view of one of the side beams also showing the upper end of one of the plow standards in position.

In the accompanying three sheets of drawing, the numeral 1, (Fig. 1) represents the outer half of the right hand side beam, 1' (Fig. 1) represents the inner half of the right hand beams; the left hand beam is made just like the right hand beam. 2, enlargements in which 3 represents a four sided rectangular opening in which the standards are secured, said openings each are provided with horizontal corrugations 4 (Fig. 7) and each half of said beams are provided with horizontal perforations 5, so that the two parts may be securely held together by bolts and nuts 6. The standards 7 of the plow feet are made to fit in said openings 3. The upper ends of said plow standards 7 are provided with corrugations 8 to correspond with the corrugations in said openings. The front ends of the side beams are pivoted in a twin block 9 provided with an upper part 9' and a lower part 10. The inner half of said beams terminating at their front ends in enlargements 11 which are turned slightly inward and each provided with a vertical perforation through which the coupling bolts 12 pass. Passing through said twin block is the front end of a central beam 13 through which passes a coupling bolt 14. Secured to the forward end and one side thereof is a clip 15 and provided between said clip 15 and said central beam at this point is a rectangular opening 16 provided with horizontal corrugations. Fitting in said rectangular opening is the shank 17 of the central front plow 18; said shank is also provided with corrugations to fit in said corrugations 16. The extreme front end of said beam turns slightly upward and is provided with horizontal perforations 19 so that the double tree of the team may be secured adjustably thereto and the rear end of said central beam is also provided with a clip 20 and between said clip and the said beam is a rectangular opening 21 provided with corrugations 22 in which fits rectangular standard 23 of the plow foot 24.

All of the standards central and side are adapted to have secured to them plow feet 25 by means of bolts or nuts or by any other suitable means. These plow feet may be in the shape of sub-soilers, colters, turning plows, shovel plows or in any other practical shape, and they may be turned so as to work straight forward, or at an angle inwardly or outwardly and they may be set higher or lower in the side beams or some may be set higher and the others lower, if so desired, and the end plows may be set higher or lower because sometimes it is desirable to break the middle deeper than the side furrows. The side beams are constructed so that they may be adjusted inwardly or outwardly by pivoting them at the points 12 or 12', (Fig. 3.) Pivoted to the rear ends of each of the side beams are perforated arms 26, which meet and lap over the central beam and are secured thereto by bolts and nuts 27. The said twin block 9 can be placed near the back end of said device so that the said beams may be widened in front and closed at the rear and that the said straps on the rear end will fit on the front end as well as on the rear end. Said device is also provided with handles 28, the forward ends of which are pivoted to the central beam just in the rear of the twin block 9 by means of bolts and nuts 29. These handles are held in position by straps or braces 30, the upper perforated ends of which are adjustably secured to said handles near their free ends, by means of bolts and nuts 31 or by any other substantial means. The lower ends of said braces are secured to said central beam, one on one side and one on the other by means of bolt and nut 32. Secured to the inner faces of said side beams near their centers are perforated clips 33', and pivoted to each one of these clips are perforated arms 34 by means of bolts 35, the free end of these arms are secured over the central beam by a bolt 36. It will be seen that the handles themselves are not pivoted or in any way secured to the cross beams 34 and therefore the widening or narrowing of the side beams do not affect the width of the handles. These cross beams 34 work in a horizontally and vertically perforated block 37. The said handles are also vertically braced by longitudinal braces 38, the front ends of which are secured on the outer end and top faces of the cross beams 34 and secured by the same bolt 35 that secures said beams 34. The rear end of said beams are provided with several perforations represented by the dotted lines 39 so that they may be adjustably secured to the under faces of the handles.

Although I have specifically described the novel features of construction, combination and arrangement of the several parts of my invention, yet I do not confine myself to such specific construction, combination and arrangement of parts but reserve and may exercise the right to make such changes therein as do not depart from the spirit of the invention or the scope of the appended claims.

Having described my invention, what I claim as new and desire to secure by Letters Patent, is:

1. An agricultural implement consisting of side beams made in two parts having between the said two parts vertical rectangular openings horizontally corrugated, said parts adjustably and laterally hinged together at their front ends in a twin block and adjustably and laterally held together at their rear ends by means of perforated arms secured together at their free ends by bolts passing through said free ends, a central beam secured longitudinally and centrally between said side beams, said center beam provided at each end with rectangular vertical openings corrugated horizontally, plow standards corrugated and adapted to fit in the said corrugated rectangular openings and adapted each to carry a plow, handles adjustably secured to said central beam and to said side beams, substantially as shown and described.

2. In an agricultural implement substantially as shown and described, two side beams made in two halves adapted to be secured together by bolts and nuts, said halves, when secured together, having between their two parts vertical rectangular openings, each provided with horizontal corrugations, said parts laterally hinged together at their front ends in a block, a central beam somewhat longer than the side beams, its front end protruding beyond said block and provided with horizontal perforations and a rectangular vertical opening, having horizontal corrugations, its rear end extending rearwardly beyond the rear end of said side beams and having a vertical, rectangular opening provided with horizontal corrugations, corrugated plow standards adjustably secured in said rectangular openings and adapted to carry plow points, said agricultural implement provided with handles, substantially as shown and described.

In testimony whereof I affix my signature in presence of two witnesses.

GEORGE T. BOUNDS.

Witnesses:
W. H. BARNHART,
J. C. JONES.

Copies of this patent may be obtained for five cents each, by addressing the "Commissioner of Patents, Washington, D. C."